United States Patent

Spada et al.

[11] Patent Number: 5,641,265
[45] Date of Patent: Jun. 24, 1997

[54] MANIPULATING DEVICE FOR HANDLING, IN PARTICULAR FOR ORIENTATING, WORKPIECES, TOOLS OR THE LIKE

[75] Inventors: Walter Spada, Marzabotto; Gianfranco Isani, Caluso, both of Italy

[73] Assignee: Sasib S.p.A., Bologna, Italy

[21] Appl. No.: 524,643

[22] Filed: Sep. 8, 1995

[30] Foreign Application Priority Data

Sep. 16, 1994 [IT] Italy ................................ GE94A0104

[51] Int. Cl.$^6$ ............................................. B25J 11/00
[52] U.S. Cl. ........................... 414/779; 414/783; 29/40; 82/86; 901/41; 483/18; 483/34; 483/50; 483/902
[58] Field of Search ........................... 414/763, 778, 414/779, 776, 783, 729, 739; 901/41, 29; 29/40; 82/83, 86; 483/18, 34, 43, 50, 901, 902

[56] References Cited

U.S. PATENT DOCUMENTS

| | | | |
|---|---|---|---|
| 2,685,122 | 8/1954 | Berthiez | 409/204 |
| 3,359,861 | 12/1967 | Johnson et al. | 409/211 |
| 3,823,644 | 7/1974 | Mello | 409/204 |
| 3,828,649 | 8/1974 | Lecailtel et al. | 409/201 |
| 3,955,257 | 5/1976 | Herbst et al. | 29/40 |
| 4,378,621 | 4/1983 | Babel | 409/211 |
| 4,478,540 | 10/1984 | Sachot | |
| 4,661,037 | 4/1987 | Sugino et al. | 414/729 |
| 4,700,442 | 10/1987 | Lahm | 483/902 |
| 5,146,663 | 9/1992 | Buessinger | 29/40 |
| 5,507,614 | 4/1996 | Leonov et al. | 414/478 |

FOREIGN PATENT DOCUMENTS

| | | |
|---|---|---|
| 0068952 | 1/1983 | European Pat. Off. |
| 1552649 | 11/1969 | Germany. |
| 55-125958 | 12/1980 | Japan. |
| 1380915 | 3/1988 | U.S.S.R. |

*Primary Examiner*—Karen B. Merritt
*Assistant Examiner*—Douglas Hess
*Attorney, Agent, or Firm*—Larson and Taylor

[57] ABSTRACT

A manipulating device for handling, in particular for orientating, workpieces, tools or the like, includes a workpiece head provided with a device for supporting at least one workpiece, a tool or the like, having at least one characteristic axis and drive device for rotating the workpiece head about a pre-established axis of rotation. The workpiece is supported so that the characteristic axis has a pre-established orientation, in other words a pre-established colatitude and longitude relative to a three-dimensional Cartesian reference frame which is defined by three mutually perpendicular axes, while the workpiece head can rotate about an axis of rotation which is inclined with respect to all three axes of the three-dimensional Cartesian reference frame and has a colatitude and a longitude other than those of the characteristic axis of the workpiece or of the tool.

6 Claims, 5 Drawing Sheets

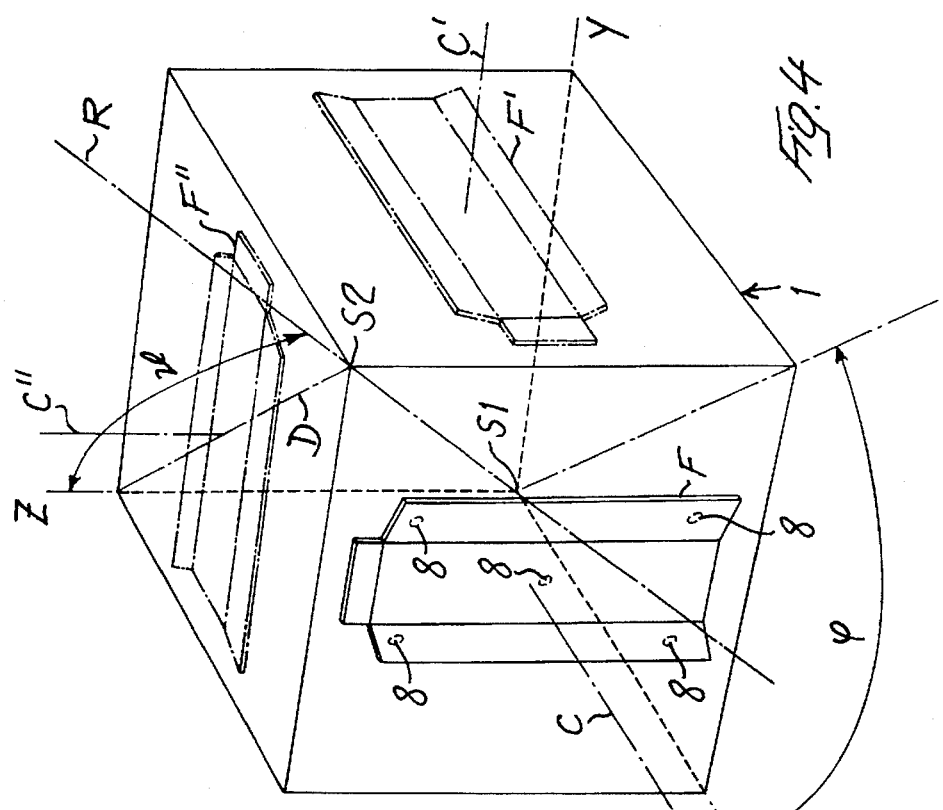
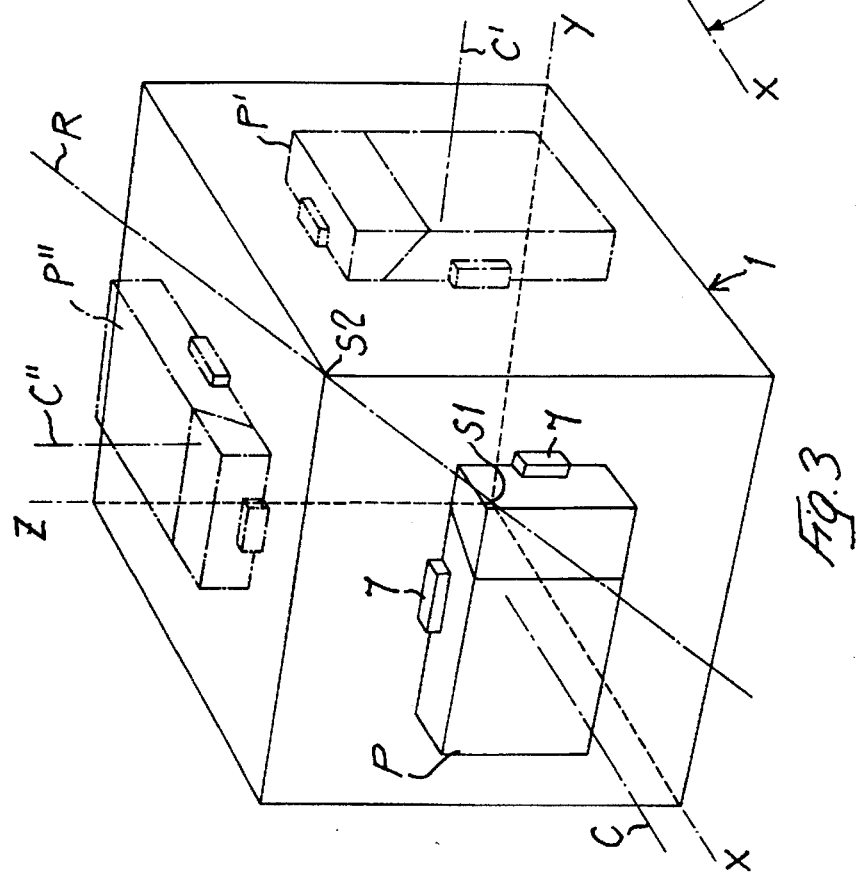

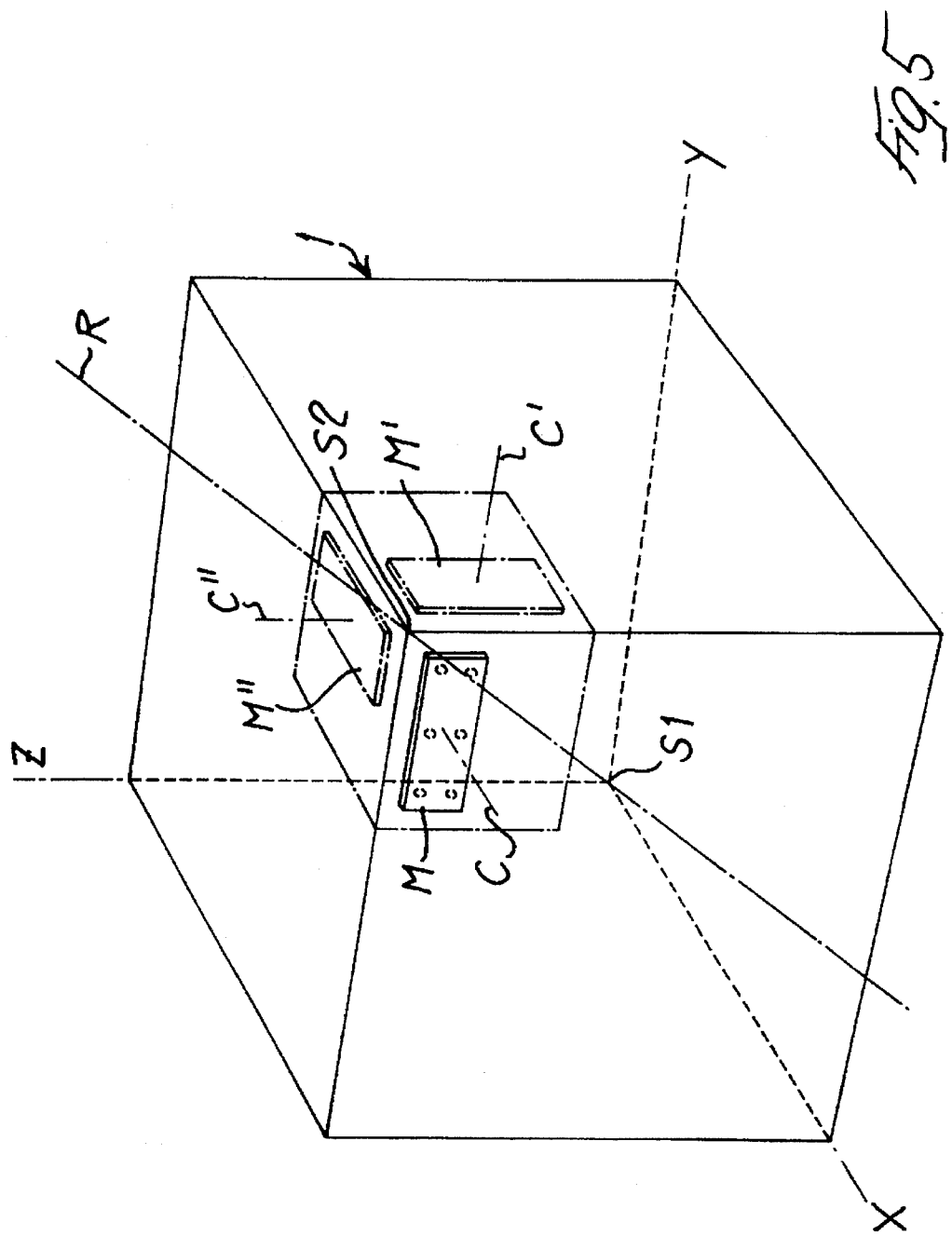

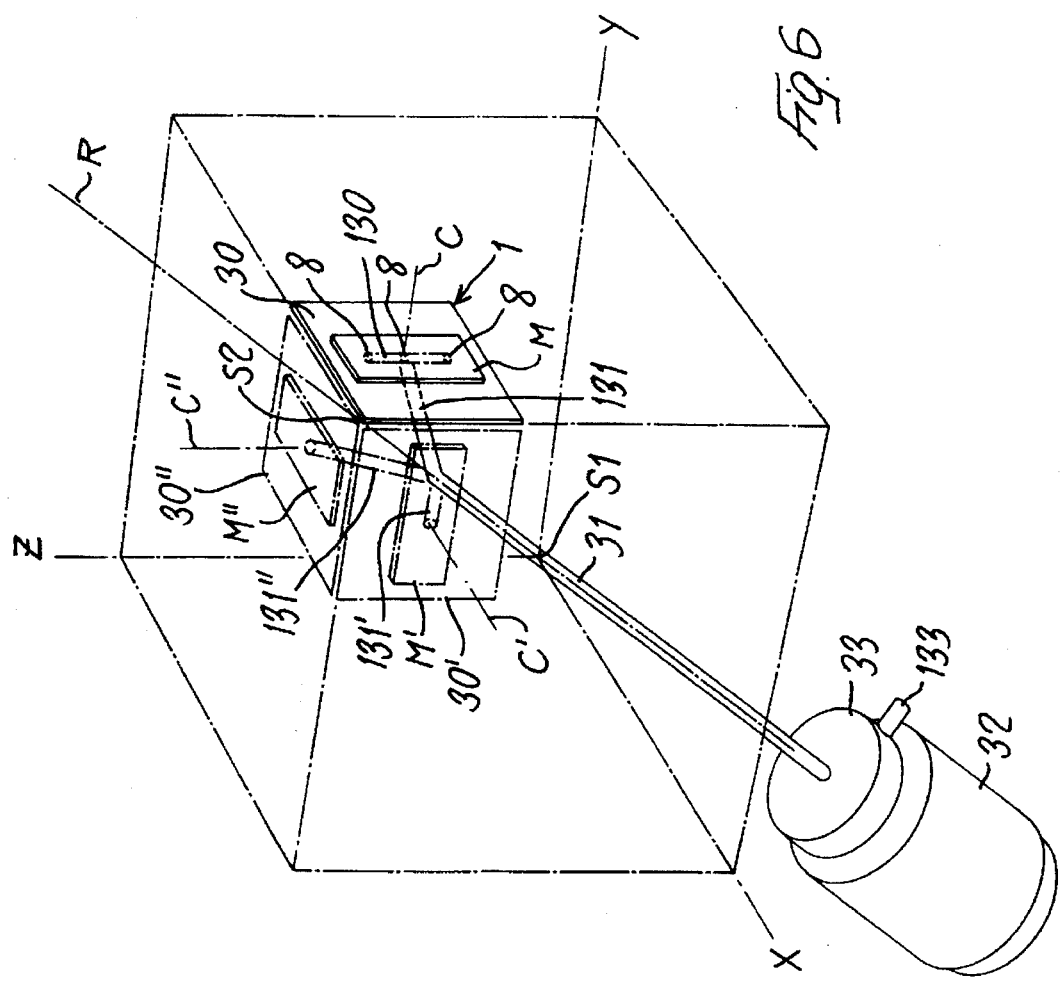

MANIPULATING DEVICE FOR HANDLING, IN PARTICULAR FOR ORIENTATING, WORKPIECES, TOOLS OR THE LIKE

BACKGROUND OF THE INVENTION

The invention relates to a manipulating device for handling, in particular for orientating, workpieces, tools or the like, of the type comprising a workpiece head provided with means for supporting at least one workpiece, a tool or the like, having at least one characteristic axis and drive means for rotating the workpiece head about a pre-established axis of rotation.

In the following description and in the claims the orientations are defined using so-called polar coordinates: the term longitude means the angle between the projection of a straight line having any orientation in space, on a plane defined by two mutually perpendicular Cartesian axes which form part of a three-dimensional reference frame, and one of the said two axes; the term colatitude means the angle between the third axis of the three-dimensional Cartesian frame, which is perpendicular to the said first two axes, and the said straight line.

Manipulating devices of the above type are widely used in automatic machines of all types, such as for example in automatic machine tools, in conveying units, feed units, etc., for example for manipulating workpieces, for supporting tools and/or for feeding material for processing.

SUMMARY OF THE INVENTION

The object of the invention is to produce a device of the type described at the outset, such that, by virtue of a simple and inexpensive construction, it is possible to orientate the workpiece or tool according to at least three different pre-established positions simply by rotating the workpiece head, and at the same time considerably limit the overall size of the device.

The invention achieves the abovementioned objects by means of a manipulating device of the type described at the outset, in which the workpiece is supported so that the characteristic axis has a pre-established colatitude and longitude relative to a three-dimensional Cartesian reference frame which is defined by three mutually perpendicular axes, while the workpiece head can rotate about an axis of rotation which is inclined relative to all three axes of the three-dimensional Cartesian reference frame and has a colatitude and a longitude other than those of the axis of orientation of the workpiece or of the tool.

As a result of this arrangement, the characteristic axis is displaced on a conical path, and the workpiece or tool can have various orientations in space, by rotating the workpiece head about a single axis.

According to a particularly advantageous embodiment, the axis of rotation has a colatitude of n90°±35° 15' 15" and a longitude of n90°±45°, (where n=0, 1, 2, 3, or 4; or n=0 if just the nearest associated portion of an axis is considered, i.e., the angle is measured to the axis of the quadrant in which the angle is located), while the workpiece or tool is positioned on the workpiece head, with its characteristic axis parallel with one of the three Cartesian axes of the three-dimensional reference frame.

Advantageously, the axis of rotation extends along the diagonal between two diametrically opposite corners of an ideal cube, while the characteristic axis of the workpiece has a pre-established direction, in particular parallel with one of the sides of the cube, in other words perpendicular to one of its faces.

The axes of the three-dimensional reference frame are chosen so that they coincide with three mutually perpendicular sides of the cube.

In one particular embodiment, the workpiece head consists of a framework or of a box which has at least one supporting surface, or alternatively two or three supporting surfaces, each of which is parallel with one of the three planes defined respectively by two axes of the Cartesian reference frame or of the three mutually perpendicular faces of the ideal cube.

Advantageously, if the workpiece head is provided with means for supporting and/or gripping the workpiece and/or tool actuating means or the like, the said workpiece head can be basically cube-shaped or partly cube-shaped, and may have a flattened portion for fixing it to the driveshaft of a rotary drive unit, on one of the two diametrically opposite corners of the cube-shaped box, the axis of rotation passing through these corners and the said fixing flattened portion being perpendicular to the said axis of rotation.

The invention also relates to other characteristics which further improve the device described above and which are the subject of the disclosure below.

BRIEF DESCRIPTION OF THE DRAWINGS

The specific characteristics of the invention and the advantages which derive therefrom will be described in greater detail in the description of certain preferred embodiments, these embodiments being illustrated by way of nonlimiting example in the appended drawings, in which:

FIG. 1 illustrates a perspective view of a manipulating device according to the invention for conveying and orientating reels of strip material or the like.

FIG. 3 illustrates a variant embodiment of the device shown in FIG. 1 for packing boxes.

FIG. 4 illustrates a variant embodiment of the manipulating device according to the invention, adapted to take die-cut articles for making product packets.

FIG. 5 is a variant embodiment of the manipulating device according to the invention for manipulating labels and tickets, in particular for state monopoly stamps which are applied to products subject to state monopoly.

FIG. 6 is a particular embodiment of the device shown in FIG. 5.

DESCRIPTION OF THE PREFERRED EMBODIMENTS

With reference to the figures, the manipulating device according to the invention has a workpiece head 1 which, in all the embodiments illustrated, consists of a cube-shaped box, or has at least one parallel surface on one side of a cube as in the embodiment shown in FIG. 6. This particular arrangement and shape should not be considered limiting and has been chosen since it considerably simplifies understanding of the orientations and of the device by virtue of a Cartesian reference frame which defines three-dimensional space using three mutually perpendicular axes and which, for the sake of simplicity, has been chosen to coincide with the mutually intersecting sides of the cube-shaped box as indicated in FIG. 4 with X, Y, Z.

The cube shape of the workpiece head also has advantages from the point of view of construction since it simplifies design and assembly of the head, ensuring that the axes which define the Cartesian reference frame are always visible.

Each workpiece 2, P, F, M has a pre-established characteristic axis C and is held on one face of the cube-shaped box by virtue of support means 6, 7, 8, in a position such that the characteristic axis C has a pre-established orientation in space, preferably parallel with one of the sides of the cube, in other words parallel with one of the axes X, Y, Z of the three-dimensional Cartesian reference frame.

The workpiece head 1 is rotatably supported about a rotation axis R which is inclined with respect to each of the three axes X, Y, Z of the reference frame and, in particular, has a longitude of 45° and a colatitude of 90°–35° 15' 15". With reference to the cube shape of the workpiece head 1, its axis of rotation is advantageously positioned to coincide with the diagonal between two diametrically opposite corners S1, S2, in other words along the diagonal of the diagonal plane D of the cube.

Figure 1:
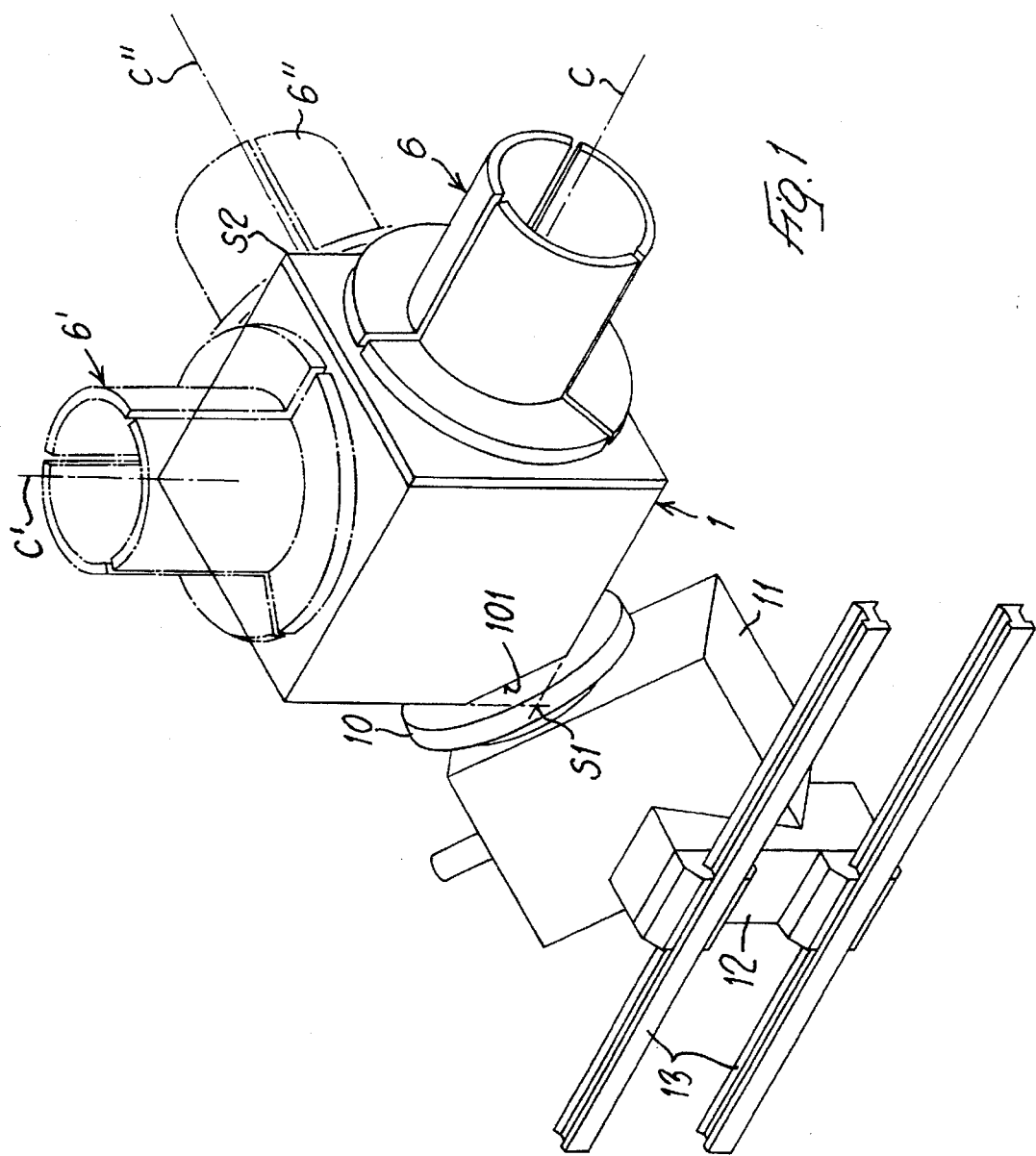
Figure 2:
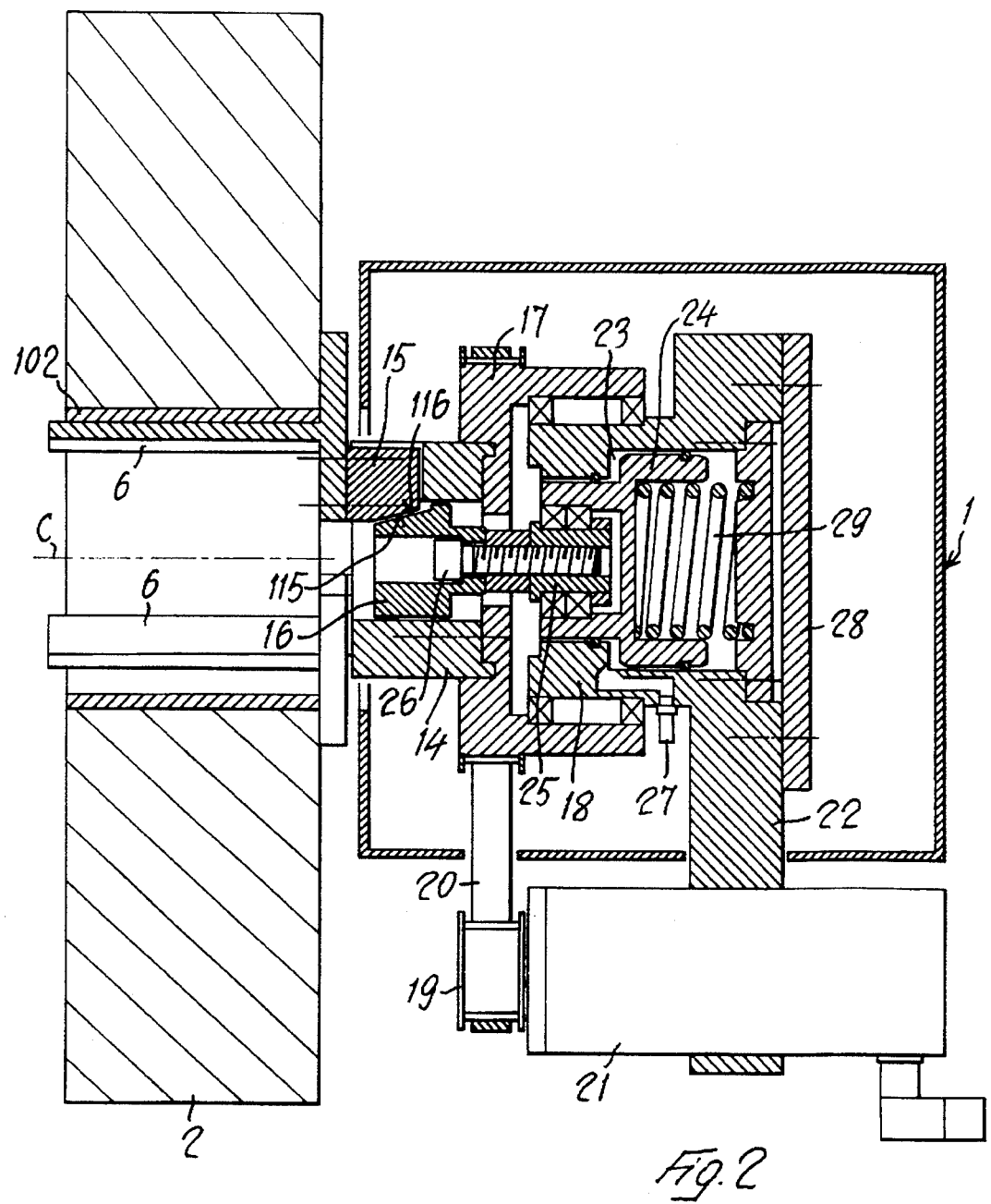
FIG. 2 is a cross section through the workpiece head of the device shown in FIG. 1.

With reference to FIGS. 1 and 2, the workpiece head 1 consists of a cube-shaped box which has, on one of its corners, a flattened portion 101 formed perpendicular to the axis of rotation, in other words to the straight line passing through the flattened corner S1 and the diametrically opposite corner S2, and via which portion it is fixed coaxially to a flange 10 provided on the free end of a driveshaft which is coaxial with the axis of rotation. The driveshaft consists of the output shaft of a speed reducer 11, the box of which is supported on a slide 12 slidably mounted on guides 13. The cube-shaped box bears an expansion chuck, the jaws 6 of which project from one of the faces of the box which intersect with one another at the corner S2 diametrically opposite the flattened portion 101, while the axis of the chuck is perpendicular to the face to which it is attached. The slide 12 and the guides 13 are made such that the workpiece head 1 together with the drive unit can slide in the direction of an axis which is perpendicular to one of the said three faces of the cube-shaped box. The chuck mechanism is mounted inside the workpiece head 1 and has a cylindrical tubular body 14 in which at least two, preferably three, radial sliders 15 are mounted, the jaws 6 being fixed to these sliders. The radial sliders 15 have a tapered surface 115 on their radially internal side via which they engage with an adjacent tapered surface 116 of a core 16 which is supported so as to slide axially inside the cylindrical body 14. The cylindrical body 14 and the tapered core 16 are carried by a coaxial toothed wheel 17 or pulley which is rotatably mounted on a stationary hub 18. The pulley or toothed wheel 17 is connected by means of a belt 20 to a pulley or toothed wheel 19 fixed to the shaft of a motor 21. The motor 21 is supported by a bracket 22 which is integral with the stationary hub 18. The stationary hub 18 is also tubular and its interior forms a cylindrical pressure chamber 23 in which a piston 24 is mounted so as to slide axially. The end of the piston 24 which points towards the jaws 6 is coaxially engaged 25, so as to rotate freely, with respect to the core 16 and can be moved axially together with the latter, by means of a coaxial traction pin 26 which projects from the rear of the tapered core 16. A pressure fluid, such as compressed air, oil or the like, can be fed in at the end of the piston 24 which points towards the jaws 6 via a duct 27, while an elastic element 29 is provided at the other end of the piston 24, between the latter and the end wall 28 which seals off the rear of the stationary tubular hub 18, this elastic element 29 acting on the piston 24 so as to push it axially in the direction of the jaws 6, in order to produce a stable position in which the jaws are expanded and therefore grip a core 102 of a reel of material 2, and an unstable position in which the jaws 6 are radially withdrawn and the reel 2 is released.

With reference to FIG. 1, by virtue of the particular position of the axis of rotation of the workpiece head 1 and of the characteristic axis C of the reel 2, a single and simple rotation about a single axis is sufficient to orientate the reel 2 so that its characteristic axis C lies along one of the three Cartesian axes X, Y, Z alternately. In this particular embodiment the reel 2, and hence the chuck, can be orientated so that their axes lie in the direction of sliding of the slide as illustrated by the solid lines and indicated by C, 6; in a vertical direction, upwards, as illustrated by the dot-and-dash lines and indicated by C' 6'; and laterally outwards, in a direction perpendicular to the plane defined by the direction of the guides 13 and by the vertical direction, as indicated by C", 6".

Needless to say the choice of reference directions can vary and, depending on operating requirements, it is possible to choose different reference and positioning directions for the characteristic axes C of the reels 2, i.e. of the chuck 6.

As an alternative to the embodiment described above, the workpiece head 1 can have any shape as long as the axis of the chuck and the axis of rotation of the said head are orientated relative to each other in a manner similar to the example illustrated.

With reference to FIGS. 3 to 6, these diagrammatically illustrate various alternative embodiments.

In FIG. 3, the workpiece head 1 has means for removable supporting a product packet P, for example, a packet of cigarettes. In this case, the characteristic axis C of the packet of cigarettes is that perpendicular to the front and rear sides. The packet P can be gripped flat against one of the faces of the cube-shaped box which form the corner S2 diametrically opposite the corner S1 by which the axis of rotation R is coupled to the drive means, by virtue of opposing gripping studs 7 which are mounted so that they can be moved towards and away from the opposing sides of the packet P which are perpendicular to the face of the cube. The gripping studs 7 can be slidably supported on the said face of the cube-shaped workpiece head 1, and can be actuated by means housed inside the said head, such as for example pneumatic actuators, cam means, or the like. By means of simple rotation about the single axis R, the packet P can be orientated so that its characteristic axis lies along three mutually perpendicular axes, similarly to the example in FIGS. 1 and 2 and as indicated by P, C, P', C', P" and C".

The variant of FIG. 4 illustrates a manipulating device according to the invention for handling die-cut articles F for making rigid packets, for example packets P similar to those shown in FIG. 3. In this case, in order to hold the die-cut article F flat against the face of the cube-shaped head 1, with its characteristic axis C perpendicular thereto, orientated perpendicularly to the said face, the latter is made in the form of a suction surface which is provided for example with a plurality of holes 8 which are connected by means of manifolds to a vacuum source, not illustrated in detail. Again, by simply rotating the workpiece head 1 about the axis R, the die-cut article F can assume three different positions in which the characteristic axis C is orientated along one of three mutually perpendicular axes, as indicated by F, C, F', C', F", C".

The workpiece head 1 can also have the means 6, 8 for supporting the workpieces 2, P, F on two or on all three surfaces parallel to the faces of a cube which are mutually perpendicular and intersect at the corner S2. Furthermore, the shape of the box need not necessarily be a cube. The head may, for example, be spherical with flattened portions on the corresponding faces of the cube-shaped head illustrated, or may be in the shape of a pyramid or truncated pyramid, etc.

A further variant of the manipulating device according to the invention is illustrated in FIGS. 5 and 6. In this example, the manipulating device is adapted to handling labels, stamps or the like, such as for example the so-called state monopoly stamps indicated by M. Similarly to the embodiment for handling and orientating die-cut articles, the manipulating device has at least one suction surface 30 which is parallel to one of the planes of the cube-shaped box which form the outermost free corner S2, through which the axis of rotation R passes. FIG. 6 illustrates a possible construction embodiment of the manipulating device shown in FIG. 5. A small shaft 31 is fixed coaxially to the shaft of the motor 32 by means of a coupling 33. The small shaft is tubular and extends between two diametrically opposite corners S1, S2 of an ideal cube, while the surface 30 for supporting the stamp M is provided on the free end of the small tubular shaft 31 and is orientated parallel with one of the three faces of the ideal cube which intersect one another at the said corner S2. The surface 30 is supported by the small tubular shaft 31 by virtue of a suitably angled terminal portion 131 which is also tubular and which communicates with a manifold 130 formed within the wall which forms the supporting surface 30. The manifold 130 opens to the outside via a plurality of suction holes 8 on that side of the supporting surface 30 which is designed to accommodate the stamp M. The small tubular shaft 31, 131, and therefore the manifold 130 are connected to a vacuum source via the means 33 which form the coupling between the said small tubular shaft and the shaft of the motor and by means of a radial pipe union 133.

Of the three positions, lying in mutually perpendicular directions, which can be assumed by the supporting surface 30, one is illustrated using solid lines and indicated by 30, M and C and the other two by M', 30', C', M", 30", C". Alternatively the small shaft 31 can, by virtue of terminal branches 131', 131", simultaneously bear only two or all three supporting surfaces 30, 30', 30", each of which is parallel with one of the mutually perpendicular faces of the ideal cube, the additional supporting surfaces 30', 30" also being suction surfaces by virtue of their respective terminal branches 131', 131" which are tubular and which may communicate with the small tubular shaft 31 or with additional individual ducts extending along the small tubular shaft 31 so as to ensure individual suction control for each surface 30, 30', 30".

As will be clear from the description of the embodiments illustrated, the manipulating device according to the invention ensures the orientation, especially in three mutually perpendicular directions, of a workpiece, a tool or the like, by a single simple rotation about a single axis R. This enables the construction and the overall size of the manipulating device to be simplified considerably. Moreover, as is clear from a comparison of the embodiments with each other, the orientating trajectory of the workpieces 2, P, F, M can be chosen so that it takes up a minimum amount of space, in particular in a radial direction with respect to the axis of rotation. This is made possible by virtue of the fact that the workpieces 2, P, F, M can be supported in an eccentric position which is extremely close to the axis of rotation and is inclined towards the latter with respect to the purely radial direction. The optional workpiece head 1 which in the examples shown in FIGS. 1 to 4 has been drawn schematically and very large for the sake of clarity, can easily be made so that its dimensions basically correspond to those of the workpiece to be manipulated. The above is clearly illustrated by the embodiment example shown in FIGS. 5 and 6, in which the supporting surface 30 is only slightly larger than the stamp M and is located in a position close to the axis R, basically as close as is permitted by the dimensions of the stamp M itself.

With reference to the example shown in FIGS. 1 and 2, the maximum overall size of the manipulating device is smaller than the overall magnitude; of the path covered in handling the reel 2 and the maximum overall size of the device is basically dictated by the dimensions of the reel 2 itself and not of the device for manipulating it.

Naturally, the invention is not limited to the embodiments described above and illustrated but may be greatly varied and modified, especially with regard to construction. Thus, in particular, the workpiece head can be made such that the workpieces are supported so that their characteristic axis C is also inclined with respect to all three axes X, Y, Z of the Cartesian reference frame, without thereby departing from the guiding principle set forth above and claimed below.

We claim:

1. A manipulating device for orientating an element having a characteristic axis comprising:

a head which is cube-shaped so as to define associated faces and corners and to define a three-dimensional Cartesian reference frame defined by three mutually perpendicular axes parallel to respective ones of said faces, said head including:
a first one of said corners having a flattened portion, and
a supporting means for supporting the element on one of said faces such that the characteristic axis thereof has a pre-established colatitude and longitude relative to the three-dimensional Cartesian reference frame of said cube-shaped head; and a drive means for rotating said head about a predetermined axis of rotation, the axis of rotation extending through said first one of said corners perpendicular to the flattened portion and through a second one of said corners diametrically opposite to said first one of said corners, whereby the axis of rotation is inclined with respect to all of said three axes of the three-dimensional Cartesian reference plane such that a colatitude and longitude of the axis of rotation is different from the colatitude and longitude of the characteristic axis, said drive means including:
a flange to which said flattened portion is fixed,
a shaft which is coaxial with the axis of rotation and which is mounted to said flange, and
a motor means for rotating said shaft about the axis of rotation.

2. A manipulating device as claimed in claim 1 wherein the colatitude of the axis of rotation forms an acute angle of ±35° 15' 15" with an associated axis of the Cartesian reference plane forming the quadrant in which the angle is located, and wherein the longitude of the axis of rotation forms an acute angle of ±45° with a nearest portion of an associated axis of the Cartesian reference plane.

3. A manipulating device as claimed in claim 1 wherein said supporting means supports the element such that the characteristic axis is parallel to one of the axes of the reference plane.

4. A manipulating device as claimed in claim 1 wherein said supporting means includes a gripping chuck mounted in the one of said faces of said head, said gripping chuck including (a) a plurality of jaws having a central axis coaxial with the characteristic axis of the element held thereby and perpendicular to the one of said faces and (b) a jaw moving means mounted in said head for moving said jaws selectively toward and away from the central axis to release or hold the element as desired.

5. A manipulating device as claimed in claim 1 and further including a translation means for translating said drive means along a movement axis such that said head is also moved along the movement axis with said drive means.

6. A manipulating device as claimed in claim 1 wherein said supporting means includes a suction surface parallel to the one of said faces for selectively holding the element thereto with suction.

* * * * *